COMPOSITION FOR PRODUCING A TEXTURED FINISH

Eliakum Gustave Shur and Hugo A. Waynor, Union, N.J., assignors to Interchemical Corporation, New York, N.Y., a corporation of Ohio
No Drawing. Filed Oct. 1, 1963, Ser. No. 312,880
15 Claims. (Cl. 260—29.4)

This invention relates to textured finishes on metals. Textured finishes on metals are extensively used in data processing machines as well as on other office machines including typewriters, dictating machines and copying machines.

There are many existing methods for producing such textured finishes, most prominent of which are: (1) applying a smooth continuous coat over all of the surface, after which a second discontinuous coat is spattered onto the first coat; (2) applying a smooth continuous coat over all of the surface, after which a second coat incompatible with the first is applied, and (3) spattering a first continuous coat with oxygenated solvents to preferentially swell localized areas of the ground coat. Textured finishes are also produced by embossing or engraving.

We have now discovered a novel composition for producing textured finishes on metal and a novel method of using this composition. Our novel method is less time consuming, less expensive and more efficient than the methods of the prior art.

Our composition comprises a dispersion of a polyvinyl chloride dispersion resin in a solution of a polyvinyl chloride solution resin in a volatile organic solvent. The solution, further, has water emulsified therein by means of a wetting agent.

The polyvinyl chloride dispersion resin is preferably a polyvinyl chloride homopolymer such as Bakelite QYNV, Geon 121, Geon 126. However, vinyl chloride copolymer dispersion resins may also be used such as Geon 202 (copolymer of 94% vinyl chloride and 6% vinylidene chloride), and Pliovic AO (copolymer of 95% vinyl chloride and 5% diethylmaleate).

The polyvinyl chloride solution resins are preferably vinyl chloride-vinyl acetate copolymers including vinyl chloride-vinyl acetate copolymers having a dibasic acid incorporated therein such as Bakelite VMCC and VMCH in which maleic acid is incorporated and hydroxylated vinyl chloride-vinyl acetate copolymers such as Bakelite VAGH.

The volatile organic solvent is preferably of the type conventionally used for vinyl-chloride acetate copolymers, suitably a combination of aromatic hydrocarbons such as benzene, toluene, xylene and aromatic petroleum hydrocarbon solvents, with ketones including acetone, methyl ethyl ketone, methyl isobutyl ketone, methyl n-propyl ketone, methyl n-butyl ketone, cyclohexanone as well as diisobutyl ketone. When using a solvent of this type, it is preferable that the ketone comprise from about 10 to 50% of the total solvent weight.

The wetting agent may be any wetting agent known in the art; substantially all wetting agents are suitable including anionic wetting agents such as esters of sodium sulfosuccinic acid including dioctyl sodium sulfosuccinate and sodium oleate; cationic wetting agents such as quaternary ammonium salts including lauryl ammonium acetate and octadecyl ammonium chloride and nonionic wetting agents such as isooctyl phenyl polyethoxy methanol and glyceryl monolaurate.

The water is emulsified into the composition by adding the water in the presence of the wetting agent and then agitating the mixture by conventional means such as stirring.

Preferably from 2 to 6 parts of dispersion type vinyl chloride resin are used for each part of solution type vinyl chloride resin. Preferably from 0.5 to 2 parts of water are emulsified for each part of dispersion resin present. The amount of solvent used will of course vary with the viscosity desired for the coating composition. Preferably from 1 to 4 parts and most preferably from 1 to 2 parts of solvent are used for each part of dispersion resin used. The wetting agent preferably comprises from 0.1 to 2% and most preferably from 0.2% to 1% of the total composition weight.

It should be noted that unless otherwise indicated, all proportions in this specification and claims are by weight.

It has been found that the addition of a small amount of urea-formaldehyde or maleamine-formaldehyde resin, preferably from 0.5% to 5%, increases the abrasion resistance of the textured coating. However, even without the urea-formaldehyde, the abrasion resistance of the coating remains quite good.

The composition may further contain stabilizers, diluents, other solvents, plasticizers and pigments conventionally used in vinyl-resin compositions.

The composition may contain any of the plasticizers conventionally used for vinyl chloride resins including phthalates such as dioctyl phthalate, di-2-ethylhexyl phthalate, diisodecyl phthalate and dicapryl phthalate, adipates such as diisoctyl adipate, sebacates such as dioctyl sebacate, phosphates such as tricresyl phosphate, epoxidized oils and polymeric type plasticizers which are polymeric esters of dibasic acids and glycols.

Likewise, a small amount of the monoethyl ether of diethylene glycol, if included in the formulation, will insure for a uniform coating without otherwise affecting the composition.

The composition may also include any of the conventional stabilizers against the thermal degradation of polyvinyl chloride resins. These include metallic salts of fatty acids or soaps as well as epoxy resins.

The following examples will better illustrate the practice of this invention.

Example 1

The following ingredients are mixed and ground in a pebble mill for 18 hours.

| | Parts by weight |
|---|---|
| Bakelite VMCC (solution type resin, a copolymer of 84.2% vinyl chloride, 15% vinyl acetate, and 0.8% maleic acid) | 4.8 |
| Bakelite QYNV (dispersion type resin, polyvinyl chloride homopolymer) | 21.0 |
| Toluene | 22.7 |
| Diisobutyl ketone | 5.4 |
| Methylisobutyl ketone | 1.4 |
| Dioctyl phthalate | 5.3 |
| An epoxy-type stabilizer, Epon 828 (the reaction product of epichlorohydrin and Bisphenol A, having an average molecular weight of 350, an epoxide equivalent weight of 175–210 and an average of almost 2 epoxy groups per molecule) | 1.1 |
| Rutile titanium dioxide | 6.4 |
| Diatomaceous silica | 1.6 |
| Ethyl ether of diethylene glycol | 3.3 |
| Anionic wetting agent (dioctyl-sodium sulfosuccinate) | 0.5 |
| Thixcin (castor oil gel) pigment wetting agent for grinding | 0.6 |

Then the following dispersion is added and milling is continued for another 60 minutes:

| | |
|---|---|
| Toluene | 4.6 |
| Carbon black | 0.10 |
| Urea-formaldehyde resin | 0.5 |

21 parts of water are added and emulsified in the mixture by high speed stirring and the coating is then applied onto a steel panel at a coating thickness of from 2 to 4 mils (wet). The film is then air dried for about 10 to 4 minutes, followed by curing at 350° F. for 20 minutes. The resulting gray finish is textured, has a leatherlike appearance, is hard, has excellent adhesion to the substrate and excellent resistance to abrasion, impact, and various chemicals and solvents, such as perspiration, xylol, trichlorethane, duplicating fluids, humidity and water.

*Example 2*

The procedure of Example 1 is repeated using the following ingredients:

| | Parts by weight |
|---|---|
| Bakelite VMCC | 4.8 |
| Bakelite QYNV | 21.0 |
| Toluene | 29.6 |
| Diisobutyl ketone | 5.4 |
| Methylisobutyl ketone | 1.1 |
| Epon 828 stabilizer | 1.1 |
| Dioctyl phthalate | 5.3 |
| Rutile titanium dioxide | 7.6 |
| Ethyl ether of diethylene glycol | 3.3 |
| Non-ionic wetting agent (isooctyl phenyl polyethoxy methanol) | 0.5 |
| Thixcin (castor oil gel) pigment wetting agent for grinding | 0.6 |

Then 19.7 parts of water are admixed with the mixture and the resulting composition is applied to a steel substrate and cured in accordance with the procedure of Example 1. The finish is a textured white and has all of the desirable properties of the finish of Example 1, except that the abrasion resistance which is still of a high order is not quite as good as the abrasion resistance of the finish of Example 1.

*Example 3*

Example 1 is repeated using the same ingredients proportions and procedure except that in place of the wetting agent of Example 1, there is used a cationic wetting agent, a mixture of quaternary ammonium salts having the formula R—N(CH$_3$)$^+$Cl— where R is dodecyl in 89% of the mixture, tetradecyl is 10% of the mixture and octadecyl is 1% of the mixture (Arquad 12–50).

The resulting textured finish has substantially the same properties as that of Example 1.

While there have been described what are at present considered to be the preferred embodiments of this invention, it will be obvious to those skilled in the art that various changes and modifications may be made therein without departing from the invention, and it is therefore, aimed to cover all such changes and modifications as fall within the true spirit and scope of this invention.

What is claimed is:

1. A composition for making a textured finish comprising an emulsion of water, a wetting agent, and a dispersion of a polyvinyl chloride resin in a volatile organic solvent solution of a polyvinyl chloride resin, from 0.5 to 2 parts by weight of water being present for each part of polyvinyl chloride dispersion resin and from 2 to 6 parts by weight of dispersion resin being present for each part of polyvinyl chloride solution resin.

2. The composition of claim 1, wherein said dispersed polyvinyl chloride resin is a vinyl chloride homopolymer.

3. The composition of claim 1, wherein said dissolved polyvinyl chloride resin is a copolymer comprising vinyl chloride and vinyl acetate.

4. The composition of claim 1, further including a minor amount of the monoethyl ether of diethylene glycol.

5. The composition of claim 1, further including urea-formaldehyde, in an amount up to 1% by weight.

6. The composition of claim 1, further including a dispersed pigment.

7. The composition of claim 1, wherein the wetting agent constitutes from 0.1% to 2% of the total composition weight.

8. A composition for making a textured finish comprising an emulsion of water, a wetting agent and a dispersion of a vinyl chloride homopolymer in a volatile organic solvent solution of a resin comprising a copolymer of vinyl chloride and vinyl acetate, from 0.5 to 2 parts by weight of water being present for each part of polyvinyl chloride dispersion resin and from 2 to 6 parts by weight of dispersion resin being present for each part of vinyl chloride-vinyl acetate copolymer solution resin.

9. A process for producing a textured finish which comprises applying to a substrate a layer of a composition comprising an emulsion of water, a wetting agent and a dispersion of polyvinyl chloride resin in a volatile organic solvent solution of a polyvinyl chloride resin and then curing said applied layer, from 0.5 to 2 parts by weight of water being present for each part of polyvinyl chloride dispersion resin and from 2 to 6 parts by weight of dispersion resin being present for each part of polyvinyl chloride solution resin.

10. The process of claim 9, wherein said dispersed polyvinyl chloride resin is a vinyl chloride homopolymer.

11. The process of claim 9, wherein said dissolved polyvinyl chloride resin is a copolymer comprising vinyl chloride and vinyl acetate.

12. The process of claim 9, wherein said composition further includes a minor amount of the ethyl ether of diethylene glycol.

13. The process of claim 9, wherein said composition further includes urea-formaldehyde, in an amount up to 1% by weight.

14. The process of claim 9, wherein from 0.1 to 2% of wetting agent are present.

15. A process for producing a textured finish which comprises applying to a substrate a layer of a composition comprising an emulsion of water, a wetting agent and a dispersion of a chloride homopolymer in a volatile organic solvent solution of a resin comprising a copolymer of vinyl chloride and vinyl acetate, and then curing said applied layer, from 0.5 to 2 parts by weight of water being present for each part of polyvinyl chloride dispersion resin and from 2 to 6 parts by weight of dispersion resin being present for each part of vinyl chloride-vinyl acetate copolymer solution resin.

References Cited

UNITED STATES PATENTS

| | | | |
|---|---|---|---|
| 2,450,902 | 10/1948 | Marberg | 260—29.4 |
| 2,494,597 | 1/1950 | Waldie | 117—41 |
| 2,600,681 | 6/1952 | Park et al. | 260—853 |
| 2,982,670 | 5/1961 | Jeff | 260—853 |
| 3,041,195 | 6/1962 | Saewart et al. | 117—41 |
| 3,137,666 | 6/1964 | Lox et al. | 260—853 |

MURRAY TILLMAN, *Primary Examiner.*

J. C. BLEUTGE, *Assistant Examiner.*